July 7, 1942.  L. ZIMMERMANN  2,288,768
POWER TRANSMISSION
Filed Dec. 23, 1940  3 Sheets-Sheet 1

INVENTOR
LUKAS ZIMMERMANN
BY *Ralph L. Tweedale*
ATTORNEY

July 7, 1942.    L. ZIMMERMANN    2,288,768
POWER TRANSMISSION
Filed Dec. 23, 1940    3 Sheets-Sheet 2
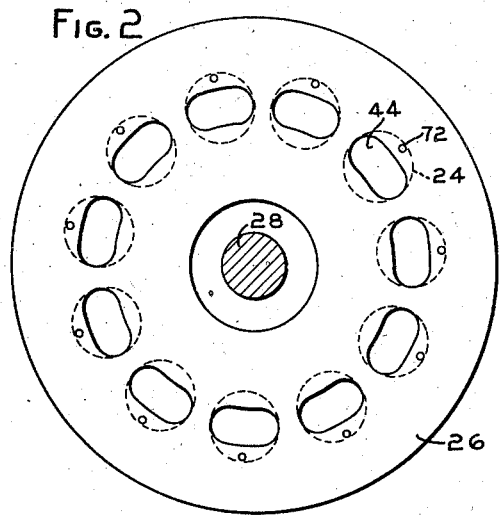
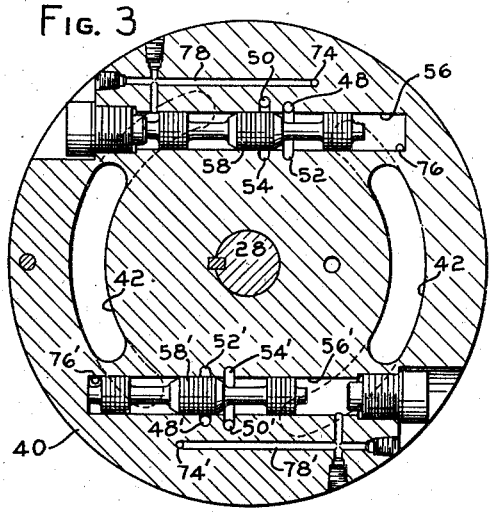
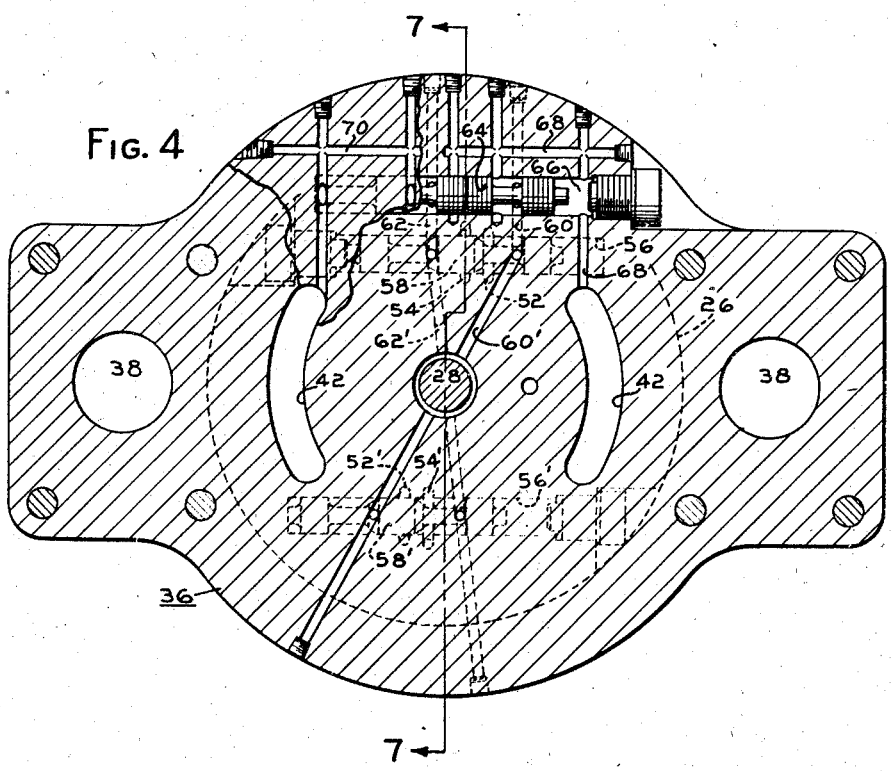
INVENTOR
LUKAS ZIMMERMANN
BY
ATTORNEY July 7, 1942.  L. ZIMMERMANN  2,288,768
POWER TRANSMISSION
Filed Dec. 23, 1940  3 Sheets-Sheet 3

INVENTOR
LUKAS ZIMMERMANN
BY
ATTORNEY

Patented July 7, 1942

2,288,768

UNITED STATES PATENT OFFICE 2,288,768

POWER TRANSMISSION

Lukas Zimmermann, Detroit, Mich., assignor to Vickers Incorporated, Detroit, Mich., a corporation of Michigan Application December 23, 1940, Serial No. 371,357

11 Claims. (Cl. 103—162)

This invention relates to power transmissions, particularly to those of the type comprising two or more fluid pressure energy translating devices, one of which may function as a pump and another as a fluid motor.

The invention is more particularly concerned with an improved fluid pressure energy translating device of the reciprocating piston type and provided with rotary valve means driven in timed relation with the piston movements.

The invention is particularly adapted for use with an axial piston type of pump or motor such as illustrated in the patent to Hans Thoma, 1,931,969, although it will be understood that many features thereof are equally adapted for use with other kinds of pumps or motors. When a pump or motor of this class is operated at high speed, considerable noise is developed which may become excessive when the apparatus is used in certain applications where noise is objectionable. In addition, the very fact that noise is produced indicates that the device is imperfect to that extent, since noise is always the result of impacts of one kind or another which in themselves are undesirable.

The present invention is based on the discovery that a major portion of the noise produced in a pump or motor of this class originates at the valving whereby each cylinder is alternately connected to and disconnected from each of the main inlet and outlet ports. Such valve mechanism inherently provides a period of cross-over when a given cylinder is midway between the inlet and outlet port connections, and it is customary, if high efficiency is to be maintained, to provide a definite small overlap during this cross-over. The piston motion during the cross-over is, of course, very slight since it occurs near the mid-center position of the piston. Nevertheless, if any positive overlap is present, there is a slight degree of piston motion during the cross-over. Furthermore, regardless of the degree of overlap, it is inherent in the action of the valve mechanism that the pressure in each individual cylinder must be very rapidly changed from the high operating pressure to the low suction pressure or vice versa while the cross-over is taking place. It is the failure of prior art valve mechanism to accomplish this which results in considerable noise, particularly at high speed.

It is an object of the present invention to provide an improved fluid pressure energy translating device in which the rate of pressure change in each cylinder during the cross-over period is so controlled as to bring each cylinder to the pressure existing in the main port at the same instant that the cylinder is connected to that port.

A further object is to provide in a valve mechanism of the character described a means for controlling the cylinder pressure at the instant it connects with each of the inlet and outlet ports and to provide means responsive to cylinder pressure at a somewhat prior instant for controlling the operation of the pressure controlling means.

Further objects and advantages of the present invention will be apparent from the following description, reference being had to the accompanying drawings wherein a preferred form of the present invention is clearly shown.

In the drawings:

Figure 2 is a fragmentary sectional view taken on line 2—2 of Figure 1.

Figure 3 is a fragmentary sectional view taken on line 3—3 of Figure 1.

Figure 4 is a fragmentary sectional view taken on line 4—4 of Figure 1.

Figure 1:
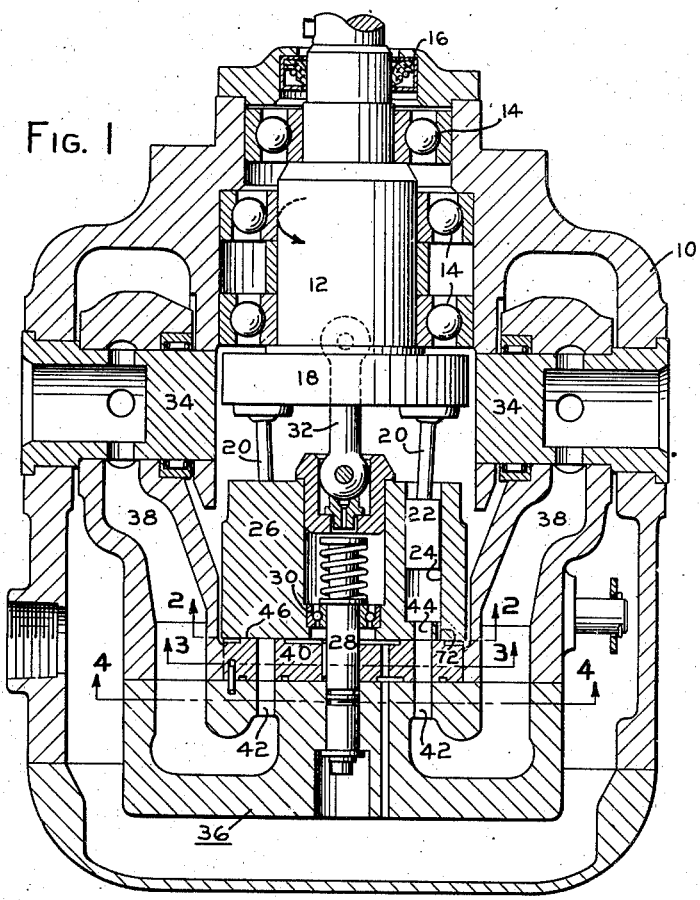
Figure 1 is a transverse sectional view of a fluid pressure energy translating device incorporating a preferred form of the present invention.

Referring now to Figure 1, the apparatus chosen for illustration of the present invention is a variable displacement pump of the type shown in the Thoma patent previously referred to. The pump comprises a casing 10 in which a shaft 12 is journalled on anti-friction bearings 14, the usual oil seal 16 being provided around the projecting end of the drive shaft 12. The shaft 12 has a flange 18 to which are pivoted a plurality of ball-ended connecting rods 20 carrying pistons 22 connected to their opposite ends by means of ball joints. The pistons are adapted to reciprocate in cylinders 24 formed in a cylinder barrel 26 which is pivoted on a stub shaft 28 by means of an anti-friction bearing 30. A Cardan shaft 32 forms a driving connection between the shaft 12 and the cylinder barrel 26, keeping the latter in step with the shaft.

Pivotally mounted on hollow stationary trunnions 34 is a yoke 36 having hollow arms 38 in fluid communication with the interior of the hollow trunnions 34 which constitute inlet and outlet connections for the device. The lower portion of the yoke 36 is formed as a valve plate which is provided with a separable wear plate 40 against which the lower face of the cylinder barrel 26 rubs. A pair of arcuate inlet and outlet ports 42 communicate with the hollow arms 38. Each of the cylinders 24 is provided with a cylinder port 44 which, in the rotation of the cylinder barrel, alternately connects with one and then the other of the two ports 42.

Figures 5, 6:
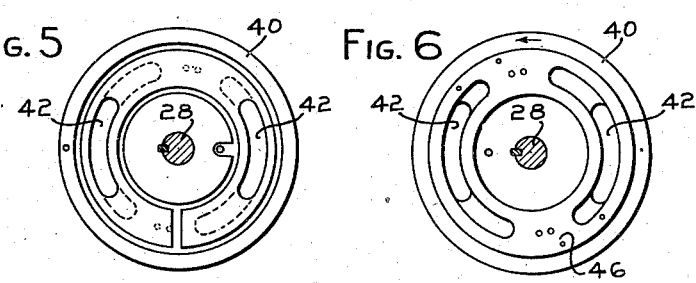
Figure 5 is a bottom view of a valve plate forming part of the apparatus of Figure 1.
Figure 6 is a top view of a valve plate forming part of the apparatus of Figure 1.
Figure 8:
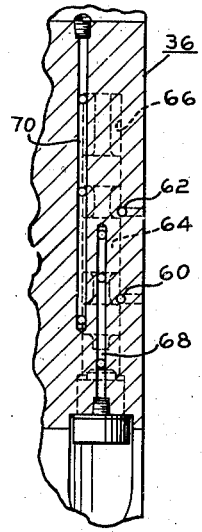
Figure 8 is a cross sectional view taken on line 8—8 of Figure 7.
Figure 7:
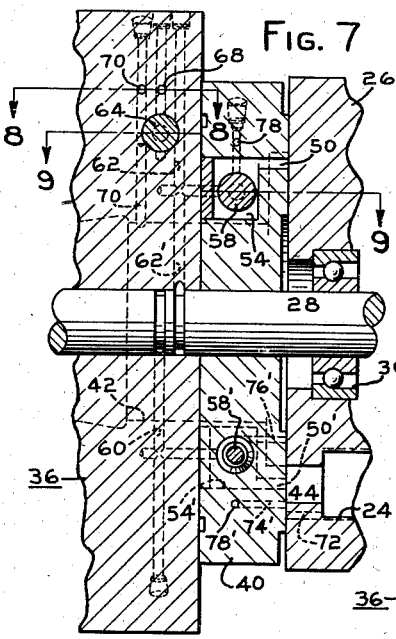
Figure 7 is a cross sectional view taken on line 7—7 of Figure 4.

Referring now to Figures 2 through 9, inclusive, it will be seen that the inlet and outlet ports 42 (see Figure 3) extend completely through the plate 40 over an arc of approximately 90°. Adjacent the rubbing face of plate 40, that is, the face away from the observer in Figure 3, the ports are milled out to extend over a greater arc as shown in dotted lines. This relationship is shown more clearly in Figures 5 and 6. Between the ends of the two ports 42 the rubbing surface of the plate which consists of an annular raised belt 46, as shown in Figures 1 and 6, is uninterrupted through an arc which is slightly less than twice the arc subtended by one of the cylinder ports 44. This uninterrupted portion constitutes the cross-over portion of the valve plate.

It will further be noted from Figure 6 that, if the cylinder barrel rotates in the direction of the arrow, then the leading or entering edge of each port 42 is nearly twice as far away from the dead-center position as is the trailing or leaving edge.

Formed in the rubbing surface 46 in the cut-off portion thereof are a pair of small auxiliary inlet and outlet ports 48 and 50. These parts and the parts described immediately following are duplicated at the diametrically opposite portion of the valve plate so that only one of them will be described.

Figure 9:
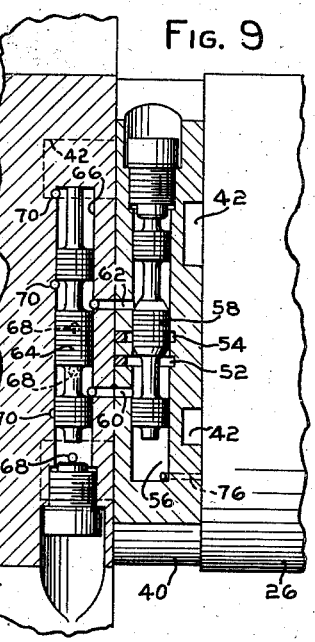
Figure 9 is a cross sectional view taken on line 9—9 of Figure 7.
Figure 10:
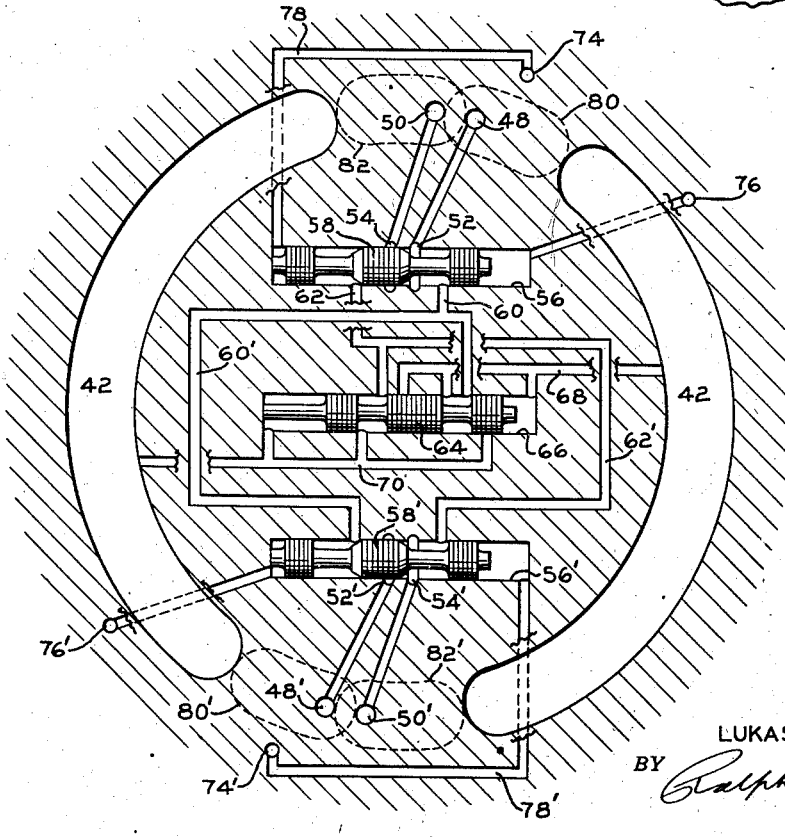
Figure 10 is a diagrammatic view showing the complete hydraulic circuit of the valve controlling mechanism with all connections in a single plane.

The port 48 is so located that it is spaced from the end of the lefthand port 42 in Figure 3 by a distance equal to the length of a cylinder port 44 (see Figure 10). Likewise, the port 50 is spaced from the end of the righthand port 42 by a similar distance. The ports 48 and 50 connect with annular ports 52 and 54 formed in a valve bore 56 in the plate 40. Slidably mounted in the bore 56 is a valve spool 58 which, in its lefthand position shown in Figure 3, connects port 52 with a passageway 60 (Figure 9) and blocks off port 54. When the valve is shifted to its righthand position, it blocks off port 52 and connects port 54 with a passageway 62 (Figure 9).

The passages 60 and 62 are adapted to be connected one to each of the ports 42 through the medium of a valve 64 slidably mounted in a bore 66 in the main yoke 36, as shown in Figures 4 and 9. In the position of the valve shown, passage 60 is connected with a passage 68 which leads to the righthand end chamber of the bore 66 and also to the righthand port 42 in Figure 4. At the same time, passage 62 is connected with a passage 70 (see Figures 7 and 8) which connects with the lefthand end of bore 66 and with the lefthand port 42. When the valve 64 is shifted to the right in Figure 4 or downwardly in Figure 9, passage 60 is cut off from passage 68 and connected to passage 70 while passage 62 is cut off from passage 70 and connected to passage 68.

An extension of the passages 60 and 62, indicated by primed reference characters, connects between the valve 64 and the second valve 58' corresponding to the valve 58. Shifting of valve 64 is, of course, controlled by the pressure differential between the two opposite ports 42. Thus, if the righthand port is on the high pressure side, valve 64 is shifted to the position shown on the drawing. Whenever the pressure should reverse and become higher in the lefthand port 42, the valve 64 will shift to the right. Thus it will be seen that passages 60 and 60' are always connected with the high pressure port while passages 62 and 62' are always connected with the low pressure port.

The control of the shifting of valves 58 and 58' is accomplished by means of sampling ports in accordance with the instantaneous pressure conditions in each cylinder as it passes a given point in its revolution. For this purpose each of the cylinders in the barrel 26 is provided with a small sampling port 72 (Figure 3) which is located radially outward from the main cylinder port 44 and thus never registers with either of the main ports 42. These sampling ports are adapted to register with two pairs of sampling ports 74—76 and 74'—76'. The ports 74 and 74' communicate by passages 78 and 78' with the left and right ends, respectively, of bores 56 and 56'. Ports 76 and 76' communicate directly with the right and lefthand ends, respectively, of these same bores.

The four sampling ports in the plate 40 are of course, located in a position so that each of the sampling ports 72 in the cylinder barrel will pass over them in turn. In addition, port 74 is spaced from port 76 by an arc equal to the spacing between two adjacent ports 72 on the barrel 26. Thus, the port 74 samples the pressure in a cylinder which has just finished passing through the cut-off period in the valving cycle while the port 76 samples the pressure in a cylinder which is fully connected with the port 42.

In operation, if the swinging yoke member 36 be swung bottom away from the observer and the shaft 12 be rotated in the direction of the arrow in Figure 1, each of the pistons 22 will move downwardly while the port 44 is in register with the righthand port 42 and will move upwardly while it is in register with the lefthand port 42. Thus, the lefthand port becomes the suction or low pressure port, and the righthand port becomes the high pressure or delivery port. Thus, valve 64 is maintained in the position shown in Figure 4 by the pressure transmitted to the righthand end of chamber 66 through the passage 68. Valve 64 accordingly connects passage 68 with the passage 60 and extension 60'. Likewise, the valve 64 connects passage 70 with the passage 62 and extension 62'.

As one of the cylinder sampling ports 72 passes onto the valve plate sampling port 74, the lefthand chamber of valve bore 56 is momentarily connected with that cylinder. This occurs as the cylinder port 44 occupies the position shown by the dotted lines 80 in Figure 10, or, in other words, just before it opens to the righthand port 42. During the same instant the sampling port 72 of the adjacent cylinder is registered with sampling port 76 in the valve plate, thus placing the righthand end of bore 56 in communication with that cylinder which, of course, is in full register with port 42.

If the pressure in the cylinder which occupies position 80 is equal to the pressure in the adjacent cylinder, the valve 58 will have equal pressures imposed momentarily on its opposite ends. Should, however, the pressure in the first cylinder be higher, the valve 58 will be shifted to the right slightly to partially close port 52. On the other hand, should the valve 58 be so far to the right that the pressure in the first cylinder at position 80 were lower than that in the second cylinder, the valve 58 would be shifted slightly to the left. In this way the opening at port 52 is regulated at each time a cylinder passes port 74. This, of course, regulates the rate of flow of oil from the high pressure or righthand port 42 through passages 68 and 60 and port 52 to the port 48.

It will be noted that previously to the first cylinder reaching the position 80, it starts out at the position 82 as it leaves the lefthand suction port 42. Immediately thereafter, the main cylinder port 44 opens to the port 48 so that, during a substantial arc of movement, flow can take place as described from port 42 to port 48. This flow gradually builds up the pressure in the cylinder so that, by the time it reaches position 80, the pressure has built up equal to the pressure in the righthand port 42.

The action at valve 58' is analogous except that at bottom dead center the cylinder pressure has to be reduced from the high delivery pressure down to the low suction pressure. If this reduction in pressure has been only partially accomplished by the time a cylinder reaches position 80', the pressure at port 74' will be higher than that at port 76', thus tending to shift valve 58' to the left, opening the port 54' wider. Should the port be opened too wide, the piston in that cylinder in passing from position 82' to position 80' will have created a suction within the cylinder more intense than any suction existing in the main suction port thus setting up a pressure differential between the opposite ends of bore 56' tending to close port 54'.

It will be noted that the high pressure oil which is trapped in the cylinder, as it passes across the cut-off space at the bottom of Figure 10, is subject to two influences tending to relieve this pressure. The first is the open passage to the suction port 42 through port 50', port 54', passage 62', valve 64 and passage 70. The second is the small outward movement of the piston in the cylinder which starts to take place as the cylinder leaves bottom dead-center position. Due to the compressibility of the oil trapped in the cylinder and to the elastic deflection of the parts, some minute flow of oil or small movement of the piston or both are necessary in order to bring this pressure down to the pressure in the main suction port 42. The amount which is drained off through port 50' is under the control of valve 58'. The increase in volume in the cylinder during travel across the cut-off space is, however, not subject to variation, so that, if too much oil is drained off by the time the cylinder reaches position 80', the last movement of the piston will create a suction in the cylinder sufficient to cause the valve 58' to move in a closing direction. In this way the port 54' is cut off sufficiently so that just the right quantity of oil will flow out of port 50' to bring the cylinder pressure down to suction port pressure at the exact instant when the cylinder sampling port 72 registers with the valve plate sampling port 74'.

Should pressure conditions, as between the two main ports 42, become reversed as by shifting the yoke across neutral in the direction toward the observer in Figure 1, the shuttle valve 64 shifts to the right thus transposing the connection between passages 60 and 62 and the two main ports 42. However, due to the reversal of pressure, passage 60 still connects with the high pressure valve port and passage 62 connects with the low pressure valve port. Under these conditions, the action of the valves 58 and 58' is reversed so that the former controls the bleeding out of fluid from cylinders passing from the pressure to the suction ports while the latter controls the inlet fluid of cylinders passing from the suction to the pressure ports.

While the form of embodiment of the invention as herein disclosed constitutes a preferred form, it is to be understood that other forms might be adopted, all coming within the scope of the claims which follow.

What is claimed is as follows:

1. In a multi-piston and cylinder fluid pressure energy translating device of the type having a rotary valve operated in timed relation with the pistons thereof and controlling communication between each cylinder and the main inlet and outlet ports, the combination of a set of auxiliary passages providing communication with each cylinder in turn during an instant just prior to its connection to each main port, and adjustable valve means for selectively varying the fluid flow through said passages to control the pressure in each cylinder as it is connected with each port.

2. In a multi-piston and cylinder fluid pressure energy translating device of the type having a rotary valve operated in timed relation with the pistons thereof and controlling communication between each cylinder and the main inlet and outlet ports, the combination of a set of auxiliary passages providing communication with each cylinder in turn during an instant just prior to its connection to each main port, adjustable valve means for selectively varying the fluid flow through said passages to control the pressure in each cylinder as it is connected with each port, and means responsive to the pressure in each cylinder during an instant while it is unconnected to either main port for adjusting said valve.

3. In a multi-piston and cylinder fluid pressure energy translating device of the type having a rotary valve operated in timed relation with the pistons thereof and controlling communication between each cylinder and the main inlet and outlet ports, the combination of a set of auxiliary passages providing communication with each cylinder in turn during an instant just prior to its connection to each main port, and adjustable valve means having connections with each main port for selectively varying and reversing the direction of the fluid flow through said passages to control the pressure in each cylinder as it is connected with each port.

4. In a multi-piston and cylinder fluid pressure energy translating device of the type having a rotary valve operated in timed relation with the pistons thereof and controlling communication between each cylinder and the main inlet and outlet ports, the combination of a set of auxiliary passages providing communication with each cylinder in turn during an instant just prior to its connection to each main port, adjustable valve means having connections with each main port for selectively varying and reversing the direction of the fluid flow through said passages to control the pressure in each cylinder as it is connected with each port, and means responsive to the pressure in each cylinder during an instant while it is unconnected to either main port for adjusting said valve.

5. In a multi-piston and cylinder fluid pressure energy translating device of the type having a rotary valve operated in timed relation with the pistons thereof and controlling communication between each cylinder and the main inlet and outlet ports, the combination of means for variably controlling the rate of pressure change in each cylinder while it is cut off from both main ports, and means responsive to the cylinder pressure at a definite instant prior to being connected with each main port for controlling the operation of said means.

6. In a multi-piston and cylinder fluid pressure energy translating device of the type having a rotary valve operated in timed relation with the pistons thereof and controlling communication between each cylinder and the main inlet and outlet ports, the combination of means for variably controlling the rate of pressure change in each cylinder while it is cut off from both main ports, a set of sampling ports associated with said valve and arranged to sample simultaneously the pressure in a cylinder which is cut off from both main ports and the pressure in a cylinder in communication with a main port, and means connected with said sampling ports for controlling the operation of said first-named means.

7. In a multi-piston and cylinder fluid pressure energy translating device of the type having a rotary valve operated in timed relation with the pistons thereof and controlling communication between each cylinder and the main inlet and outlet ports, the combination of an auxiliary valve for variably admitting or exhausting fluid to or from each cylinder in turn while it is cut off from both main ports, and means responsive to the cylinder pressure, at an instant prior to being connected to each main port, for controlling the operation of said auxiliary valve.

8. In a multi-piston and cylinder fluid pressure energy translating device of the type having a rotary cylinder barrel provided with individual cylinder ports and a stationary valve plate provided with arcuate main inlet and outlet ports with which each cylinder port registers in alternation, and provided with cut-off lands between the inlet and outlet ports, the combination of a set of auxiliary valve ports positioned in said lands, a passage connecting each auxiliary port with one of said main ports, a shiftable valve in said passage, a sampling port in the cylinder barrel at each cylinder and disposed out of register with the main ports, a set of sampling ports in the valve plate disposed to register, one with the sampling port of a cylinder which is on a land and the other with the sampling port of a cylinder which is on a main port, means connecting said one sampling port to direct fluid to urge the shiftable valve in one direction, and means connecting said other sampling port to direct fluid to urge the shiftable valve in the other direction.

9. In a multi-piston and cylinder fluid pressure energy translating device of the type having a rotary cylinder barrel provided with individual cylinder ports and a stationary valve plate provided with arcuate main inlet and outlet ports with which each cylinder port registers in alternation, and provided with cut-off lands between the inlet and outlet ports, the combination of a set of auxiliary valve ports positioned in said lands, a passage connecting each auxiliary port with one of said main ports, a shiftable valve in said passage, a sampling port in the cylinder barrel at each cylinder and disposed out of register with the main ports, a set of sampling ports in the valve plate disposed to register, one with the sampling port of a cylinder which is on a land and the other with the sampling port of a cylinder which is on a main port, means connecting said one sampling port to direct fluid to urge the shiftable valve in one direction, and means connecting said other sampling port to direct fluid to urge the shiftable valve in the other direction, said sampling ports in the valve plate being spaced to register with the respective cylinder sampling ports simultaneously.

10. In a multi-piston and cylinder fluid pressure energy translating device of the type having a rotary cylinder barrel provided with individual cylinder ports and a stationary valve plate provided with arcuate main inlet and outlet ports with which each cylinder port registers in alternation, and provided with cut-off lands between the inlet and outlet ports, the combination of a set of auxiliary valve ports positioned in said lands, a passage connecting each auxiliary port with one of said main ports, a shiftable valve in said passage, a sampling port in the cylinder barrel at each cylinder and disposed out of register with the main ports, a set of sampling ports in the valve plate disposed to register, one with the sampling port of a cylinder which is on a land and the other with the sampling port of a cylinder which is on a main port, means connecting said one sampling port to direct fluid to urge the shiftable valve in one direction, means connecting said other sampling port to direct fluid to urge the shiftable valve in the other direction, and a second shiftable valve controlled by the pressure differential between said main ports for selectively transposing the connection of said passage with the respective main ports.

11. In a multi-piston and cylinder fluid pressure energy translating device of the type having a rotary valve operated in timed relation with the pistons thereof and controlling communication between cylinder and the main inlet and outlet ports, the combination of means for varying the timing of the connection of each cylinder to the main inlet and outlet ports with respect to the timing of disconnection therefrom, and means responsive to cylinder pressure for controlling said varying means.

LUKAS ZIMMERMANN.